United States Patent [19]
Endsley et al.

[11] Patent Number: 6,005,613
[45] Date of Patent: Dec. 21, 1999

[54] MULTI-MODE DIGITAL CAMERA WITH COMPUTER INTERFACE USING DATA PACKETS COMBINING IMAGE AND MODE DATA

[75] Inventors: Jay A. Endsley, Fairport; Thomas N. Berarducci, Webster; Wayne E. Prentice, Honeoye Falls, all of N.Y.

[73] Assignee: Eastman Kodak Company, Rochester, N.Y.

[21] Appl. No.: 08/712,704

[22] Filed: Sep. 12, 1996

[51] Int. Cl.⁶ .................................................. H04N 5/76
[52] U.S. Cl. ........................ 348/231; 348/220; 348/552
[58] Field of Search .................................. 348/207, 220, 348/221, 231, 373, 375, 552, 233; 386/117; 358/909, 906.1; H04N 5/225

[56] References Cited

U.S. PATENT DOCUMENTS

| | | | |
|---|---|---|---|
| 5,475,441 | 12/1995 | Parulski et al. | 348/552 |
| 5,734,425 | 3/1998 | Takizawa et al. | 348/231 |

*Primary Examiner*—Tuan Ho
*Attorney, Agent, or Firm*—Pamela R. Crocker

[57] ABSTRACT

A digital camera, which captures images and transfers the captured images to a host computer, includes an image sensor exposed to image light for capturing the images and generating image signals; an A/D converter for converting the image signals into digitized image data; a digital interface for transferring the digitized image data to the host computer; means for controlling the image sensor in at least two different camera configurations, each configuration including configuration information defining a plurality of camera parameters; and means for communicating at least part of the configuration information along with the digitized image data to the computer via the digital interface.

11 Claims, 4 Drawing Sheets

MULTI-MODE DIGITAL CAMERA WITH COMPUTER INTERFACE USING DATA PACKETS COMBINING IMAGE AND MODE DATA

FIELD OF THE INVENTION

The invention relates generally to the field of electronic photography, and in particular to a digital camera capable of interfacing with a computer.

BACKGROUND OF THE INVENTION

There are generally two types of electronic cameras, those that produce motion images and those that produce still images. Typical motion cameras include motion video cameras and computer-connected cameras like the Color Quick-Cam™ camera sold by the Connectix Corporation, and typical still cameras include the Kodak line of digital cameras, including the DC40 and DC50 cameras sold by the Eastman Kodak Company. With motion video cameras, it is typical to input images to a computer via a "frame grabber" board. In this case still images and motion images are captured using a single field or frame of the video. Therefore, the processing for motion and still images, performed in hardware inside the camera, is the same whether still or motion images are captured.

With electronic still cameras, the output processing is typically oriented toward still images, since still image capture is the object of the camera. U.S. Pat. No. 5,402,170, entitled "Hand-manipulated Electronic Camera Tethered to a Personal Computer", describes a digital still camera tethered to a computer for capturing an image and providing the captured image to the computer for storage therewith. Capture of images can be initiated from the camera, but its shutter button, which is controlled pursuant to a status signal from the computer, is used only to initiate the capture of still images.

If the electronic still camera provides another mode, it is typically subsidiary to the main purpose. For example, in U.S. Ser. No. 08/367,399, filed Dec. 30, 1994 (entitled "Electronic Camera Having Dual Modes for Composing and Capturing Still Images" and assigned to the same assignee as the present invention), an electronic still camera is described in which a motion mode is used to provide a "preview" image on an LCD viewfinder prior to still mode capture. The camera does not output the motion image data, but simply displays the motion data on the LCD display. Being part of its fixed signal processing, the camera does not allow the user to affirmatively elect between the motion and the still mode.

U.S. Pat. No. 5,301,244, entitled "Computer Input Scanner Incorporating Multiple Scanning Modes", describes a film scanner useful as an input device for a computer. The film scanner is operable in two modes: the first mode is a low resolution monochrome prescanning mode used for composing (zooming and cropping) the image, and the second is a high-resolution color sequential mode in which three successive high resolution color scans are obtained. Two user-controlled switch functions on the scanner are used: one to continuously capture low resolution frames in the prescan mode, and the second to initiate a high-resolution scan. These switch functions, however, always perform the same task, that is, either to initiate prescan or to capture a high resolution image.

While describing two modes of operation in some cases, the prior art does not allow flexibility in user selection of these modes, or in the communication of mode information between a host computer and the camera. As a result, the functionality of user-controlled switches, e.g., the shutter button, remains fixed.

SUMMARY OF THE INVENTION

The present invention is directed to overcoming one or more of the problems set forth above. Briefly summarized, according to one aspect of the present invention, a digital camera, which captures images and transfers the captured images to a host computer, includes an image sensor exposed to image light for capturing the images and generating image signals; an A/D converter for converting the image signals into digitized image data; a digital interface for transferring the digitized image data to the host computer; means for controlling the image sensor in at least two different camera configurations, each configuration including configuration information defining a plurality of camera parameters; and means for communicating at least part of the configuration information along with the digitized image data to the computer via the digital interface.

By providing two or more configurations that are immediately accessible to the camera, and which can be set from the host computer, the flexibility of the camera is increased. For example, the camera may be configured for capturing still and motion images with a "shutter" button that is used for different purposes in the different configurations. In one case, pressing the shutter button changes the camera from the motion mode to immediately capture a still image. In a second case, pressing the shutter button keeps the camera in motion mode, but enables the recording of a motion sequence in the computer hard drive memory. It does so by sending a code along with the image to indicate that the button has been pressed, thereby triggering the storage of the image sequence on the computer's disk. When the button is pressed a second time, this indicates to the computer to stop the storage process. The digital camera output data includes both the digital image data and a "configuration code" that indicates which of the two configurations was used for the image data presently being output by the camera. This indicates to the host how to process the image data, whether to store the image data, and/or simply display the image data. It also provides a "sync code" that allows the computer to detect data dropouts and resync the video stream by dropping a frame.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed for practice of the invention is conventional and within the ordinary skill in such arts.

Figure 1:
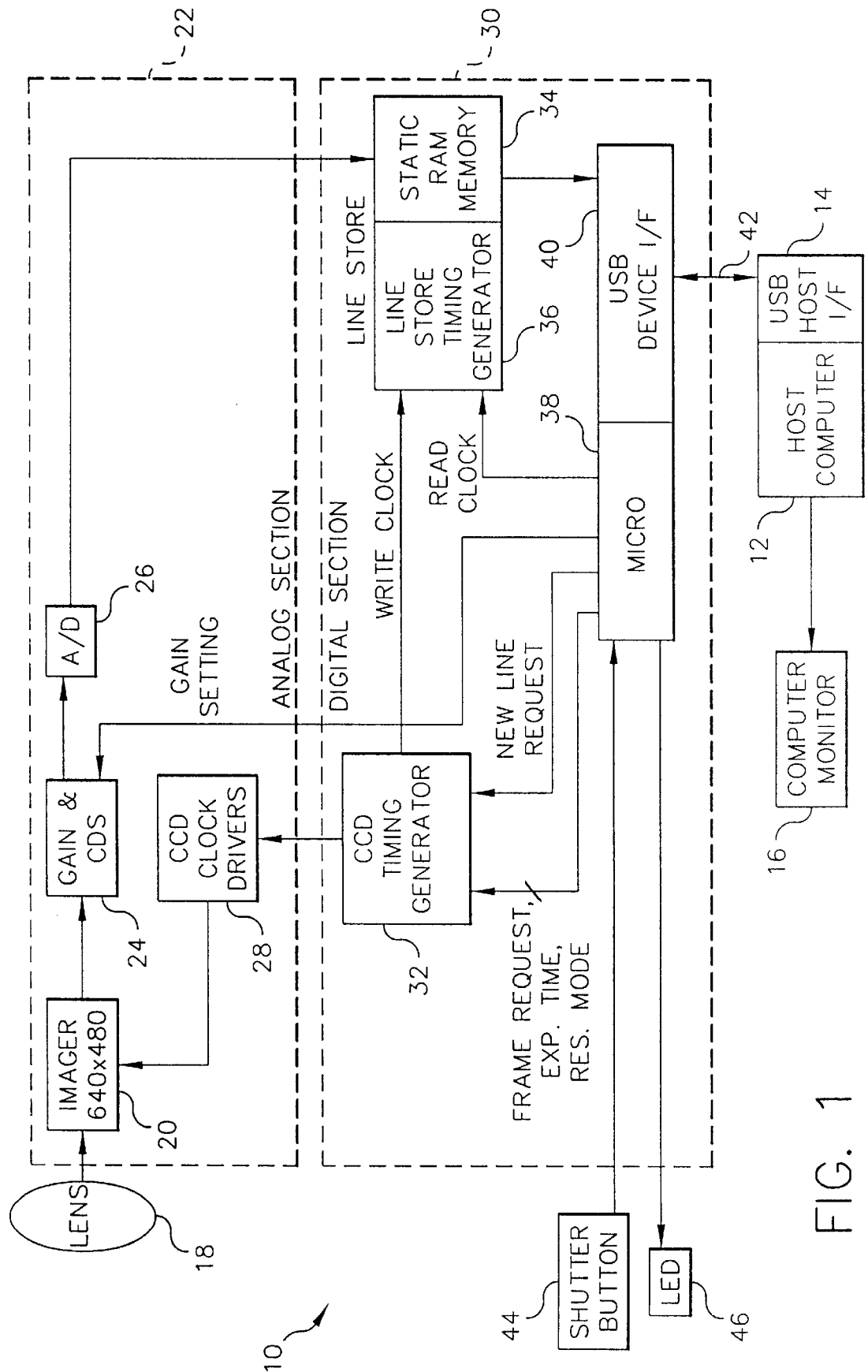
FIG. 1 is a block diagram of a multi-mode digital camera with a computer interface according to the invention.

A block diagram of a multi-mode digital camera with computer interface according to the invention is shown in FIG. 1. The camera 10 is connected to a host computer 12 via a USB (universal serial bus) digital host interface 14, which also provides power to the camera 10. USB is a well-known shared bus that can be connected to other devices, such as keyboards, printers, etc. (USB is described in the *Universal Serial Bus Specification,* 1.0 Final Draft Revision, Nov. 13, 1995, which can also be viewed on the Web at http://www.teleport.com/-USB.) The camera 10 can acquire both still and motion images. The camera data is processed by the host computer 12 to create final images that can be displayed on a computer monitor 16, e.g., transmitted along with audio as part of a "computer videoconference", etc. The camera 10 can produce both high quality (i.e., high resolution) still images and high frame rate, reduced resolution motion images.

The camera 10 includes an optical section 18 for imaging light from a subject upon an electronic image sensor 20. A preferred image sensor is a Kodak KAI-0320CM interline transfer, progressive-scan charge-coupled-device (CCD) image sensor with a usable active image area having 640 columns and 480 rows of color photoelements arranged in the well-known Bayer color filter array pattern (see U.S. Pat. No. 3,971,065 for a description of the Bayer pattern). An analog section 22 in the camera 10 includes the sensor 20, a CDS/gain block 24 for performing correlated double sampling (CDS) and setting the analog gain, an analog-to-digital (A/D) converter 26 for converting the analog output signal from the CCD sensor 20 to ,e.g., an 8-bit digital signal, and CCD clock drivers 28 for clocking the sensor 20. A digital section 30 includes a CCD timing generator 32, a static RAM memory 34, a line store timing generator 36, a microprocessor 38, and a USB device interface 40. The USB device interface 40 connects to the USB host interface 14 by means of a USB cable 42.

The sensor 20 is controlled by the timing generator 32 via the CCD clock driver 28. The digital data from the sensor 20 is temporarily stored in the static RAM memory 34, preferably a 64K bit static RAM memory (for example part number IDT7164 made by Integrated Device Technology, Inc.) which is controlled by a line store timing generator 36 so as to serve as a line store. Besides controlling the sensor 20, the CCD timing generator 32 also controls the line store write clock applied to the line store timing generator 36. The output of the line store memory 34 is connected to the host computer 12 via the USB device interface 40, which operates at a maximum data rate of 12 M bits/sec. (See the article "Universal Serial Bus to Simplify PC I/O", by Michael Slater in *Microprocessor Report,* Volume 9, Number 5, Apr. 17, 1995 for more detail about the benefits of the USB interface.) The microprocessor 38, which may be the Intel 82930 microprocessor, reads data from the line store 34, and transfers the data to the computer 12 via the USB interface 40 (which may be incorporated as part of the microprocessor 38). The USB cable 42 includes four wires, one pair for sending data to and from the host computer 12, and a second pair for supplying power to the camera 10 from the host computer 12.

As generally used, the USB interface has a clock rate of 12 MHz. The clock is transmitted encoded along with the differential data, and the data is transferred in packets. A SYNC field precedes each data packet to allow the receiver (s) to synchronize their bit recovery clocks. The basic unit of scheduling is 1 mSec. All bus transactions involve the transmission of up to three packets, which include from 1 to 1024 bytes of data plus a 3 bytes header that includes an error detection code word. Each transaction begins when the host computer 12, on a scheduled basis, sends a USB packet describing the type and direction of transaction, the USB device address, and endpoint number. This packet is referred to as the Token Packet. The USB device that is addressed, e.g., the camera 10, selects itself by decoding the appropriate address fields. In a given transaction, data is transferred either from the host to a device or from a device to the host. The direction of data transfer is specified in the token packet. The source of the transaction then sends a Data Packet or indicates it has no data to transfer. The destination in general responds with a Handshake Packet indicating whether the transfer was successful.

The USB data transfer model between a source or destination on the host and an endpoint on a device is an abstraction referred to as a "pipe". There are two types of pipes: stream and message. Stream pipes are always unidirectional in their communication flow. Stream data has no USB defined structure while message data does. Additionally, pipes have associations of data bandwidth, transfer service type, and endpoint characteristics like directionality and buffer sizes. Pipes come into existence when a USB device is configured. USB bandwidth is allocated among pipes. Multiple stream mode pipes can be serviced at different intervals and with packets of different sizes.

USB supports two types of pipes, "isochronous" (which guarantees a continuous data stream using a subset of the USB data rate) and "asynchronous" (which transfers blocks of data but may incur a delay before the transfer can begin). The camera USB interface has one pipe for transporting control data to the camera and another for transporting image data from the camera. The latter pipe is a "stream" pipe that can use either "bulk" data transfer mode (asynchronous) or isochronous (streaming real time data transfer) mode which occupies a prenegotiated amount of USB bandwidth with a prenegotiated delivery latency. The USB allocates bandwidth for isochronous pipes when the pipe is established. Bulk and Isochronous mode pipes are stream pipes that deliver data in the data packet portion of bus transactions with no USB required structure on the data content.

Figure 2:
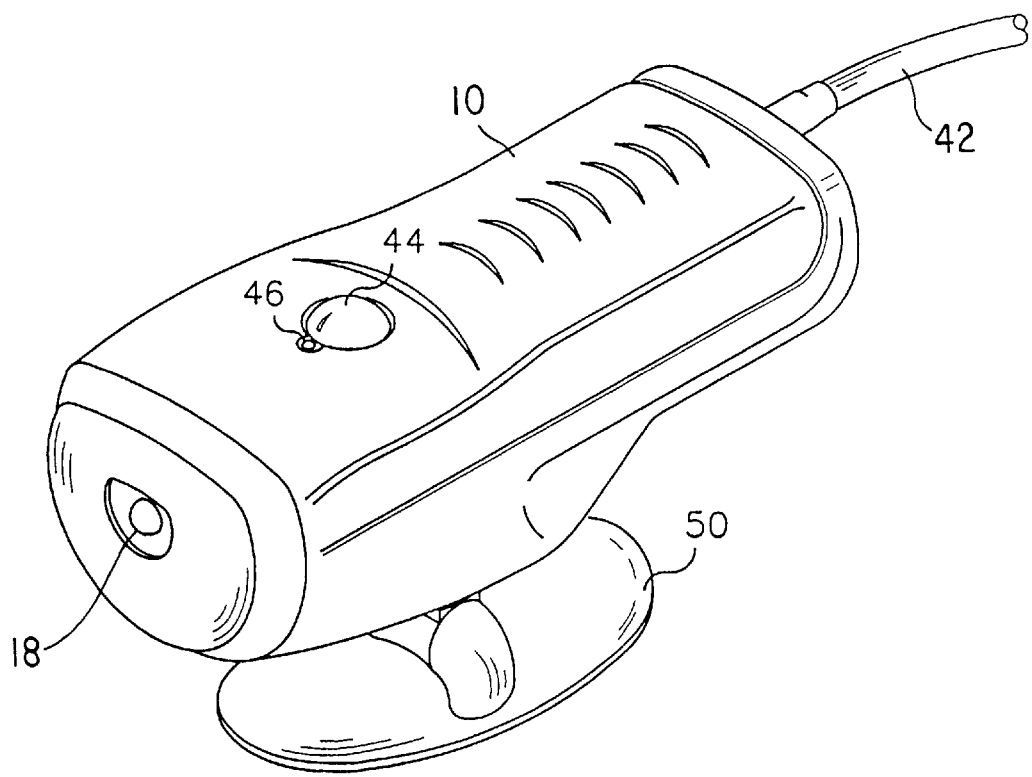
FIG. 2 is a drawing of the camera encasement for the camera shown in FIG. 1.

The camera 10, as shown in FIG. 1, also includes a shutter button 44 for initiating an image capture sequence and a light emitting diode (LED) 46 for indicating operation of the camera during the capture sequence (i.e., to indicate that the camera is taking a picture). A drawing of the camera encasement is shown in FIG. 2. The camera 10 includes a detachable stand 50 which can be placed on top of the computer monitor 16 for "hands-free" operation. The camera 10 can also be removed from the stand 50 and used for "hand-held" operation. The encasement of the camera 10 shows the shutter button 44 and the LED indicator light 46, which is useful for the "hand-held" mode.

The host computer 12 controls the camera picture-taking process by instructing the camera 10 when to take still or motion pictures, and setting the electronic exposure time and the analog gain in the CDS/gain block 24 via the microprocessor 38. The USB hardware and software provides communication between the host 12 and the camera 10 through the aforementioned abstraction called a "pipe". When the camera 10 is connected to the host 12, camera driver software running on the host 12 indicates the latency and bandwidth required for the camera.

The operational modes of the camera 10 can be adjusted from the host computer 12. More particularly, the microprocessor 38 includes camera registers 72 that store at least two different camera configurations communicated from the host computer 12 for controlling the image sensor in at least two modes, wherein each configuration includes information defining a plurality of camera parameters as shown in the first column of Table 1. As further shown in the second column of Table 1, the parameters may assume a number of allowed values that are appropriate for either motion (continuous) or still (single shot) modes.

TABLE 1

Camera configuration parameters

| Parameter | Allowed values |
| --- | --- |
| Capture mode | Continuous or single-shot |
| Button mode | Enabled or disabled |
| Link field | Configuration 0, configuration 1, stop |
| Color mode | Color or monochrome |
| Number of bits per sample | 8 or 4 |
| Crop values | Starting line #, Ending line # |
|  | Starting pixel #, Ending pixel # |
| Green horizontal subsampling factor | 1, 1/2, 1/4 (320, 160, or 80 pixels max.) |
| Green vertical subsampling factor | 1, 1/2, 1/4, 1/8 (480, 240, 120, or 60 lines max.) |
| Red/Blue horizontal subsampling factor | 1, 1/2, 1/4, 1/8 (320, 160, 80, or 40 pixels max.) |
| Red/Blue vertical subsampling factor | 1, 1/2, 1/4, 1/8 (240, 120, 60, or 30 pixels max.) |
| Integration time | 1 msec to 100 msec |
| Analog gain | 1–7 unit adjustments |

Many of these parameters are particularly useful in the continuous (motion video) capture mode, in order to provide a higher video frame rate, and in determining how the camera moves from one configuration to the other. For example, the camera 10 is configured by input from the host computer 12 by specifying the values of the group of parameters shown in Table 1, as follows. (1) From the "color" mode parameter, either a color image is selected, thereby causing the camera to transfer RGB images, or a monochrome image is selected by specifying the "monochrome" value, thereby causing the camera to transfer only the green data. (2) By means of the crop value parameter, the selected starting and ending lines and pixels may be used to "crop" the image before it is transferred, thereby further reducing the amount of data that has to be sent to the computer 12. This also has the effect of acting as a "digital zoom", and can be presented on screen as either a smaller image than the non-cropped original, or as a "zoomed in" version of the original. (3) By specifying the horizontal and vertical subsampling factors (to be other than the allowed value of 1), the desired color plane (Red, Green, and Blue) is accordingly subsampled as the data is stored into the line store 34. Since the Bayer color filter pattern is a mosaic of separate colors, the number of pixels obtained by use of each subsampling factor corresponds to a fraction of the number of red, green, and blue pixels in the pattern. (4) By specifying the number of bits per sample, it is possible to select different color depths (all 8 bits/color vs. using only 4 bits/color) as the data is read from the line store 34 and transferred over the USB interface 40. (5) The exposure of each image is determined by the integration time and gain setting of the corresponding configuration, i.e., taken together these parameters make up the exposure.

The button mode parameter determines whether the shutter button 44 is enabled or disabled. When the shutter button is disabled, pressing the button does not change the mode. However, the camera conveys the button status (pressed or not pressed) to the computer, and this can be useful (as will be described) in instructing the computer to save all the images transmitted or not. When the shutter button is enabled, pressing the button causes the camera to automatically shift to the other configuration stored in the camera registers 72, i.e., if presently in configuration 0, then the camera shifts to configuration 1 or if presently in configuration 1, then the camera shifts to configuration 0. The link field parameter determines which configuration will be used to capture the next image frame. For example, if the camera is in configuration 0 and the link field is also configuration 0, the camera will examine the link field after capturing each frame and see that it should always return to the same configuration. Thus, the camera will continue to take pictures in configuration 0 until the shutter button is pressed. This is the typical operational sequence for the motion or continuous capture mode. On the other hand, if the camera is currently in configuration 0 and the other configuration stored in the camera registers 72 is configuration 1 with a link field of 0, when the shutter button is pushed the camera shifts from configuration 0 to configuration 1, takes one frame, looks at the new link field (which is 0), and shifts back to configuration 0. This is the typical operational sequence for a still capture. The "stops" value in the link field parameter idles the camera such that it is not producing pictures. This can be useful in shutting the camera down, e.g., after taking a still image until the shutter button is again pressed, which restarts the motion mode.

As set forth in Table 1, the parameters include allowed values appropriate for two different camera configurations: therein called camera configuration 0 and camera configuration 1. Table 2 shows a specific selection from the allowed values, wherein configuration 0 is a low resolution continuous (motion) configuration and configuration 1 is a full resolution single-shot (still) configuration. When the camera is first powered up, default values are stored such as those shown in the first column of Table 2 for the continuous capture mode and in the second column for the single-shot capture mode. Since the continuous mode (configuration 0) is used first and the link field is set to configuration 0, the camera 10 begins sending a series of color motion images, each with 320×240 green pixels and 160×120 each red and blue pixels per image, with 4 bits per color. This allows a frame rate of over 10 frames per second at a data transfer rate of 5 Mbits per second. The user can hold the camera while viewing the computer monitor display 16 to create a motion sequence for videoconferencing, or in order to frame a person, object, or document to be captured. When the user presses the shutter button 44, the camera immediately moves to the single-shot mode and uses the parameters from configuration 1, which in this example captures a color image with 320×480 green pixels and 320×240 red and blue pixels, with 8 bits per color. Since the link field parameter is set to configuration 0, a still is captured and the camera immediately shifts back to configuration 0, the continuous mode. Because the parameters for the two configurations are programmed by the computer but stored in the camera mode registers 72, the desired type of image can be immediately captured when the shutter button 44 is pushed, without waiting for additional communications between the host computer 12 and the camera 10.

TABLE 2

An example of camera configuration parameters
for motion to still capture

| | Configuration 0 value | Configuration 1 value |
|---|---|---|
| Capture mode | Continuous | Single-shot |
| Button press mode | Enabled | Enabled |
| Link field | Configuration 0 | Configuration 0 |
| Color mode | Color | Color |
| Number of bits per sample | 4 | 8 |
| Crop values | Starting line = 1, Ending line = 480 Starting pixel = 1, Ending pixel = 640 | Starting line = 1, Ending line = 480 Starting pixels = 1, Ending pixel = 640 |
| Green horizontal subsampling factor | 1 (320 pixels) | 1 (320 pixels) |
| Green vertical subsampling | 1/2 (240 lines) | 1 (480 lines) |
| Red and Blue horizontal subsampling factor | 1/2 (160 pixels) | 1 (320 pixels) |
| Red and Blue vertical subsampling factor | 1/2 (120 lines) | 1 (240 lines) |
| Integration time | 30 msec | 100 msec |
| Analog gain | 7 | 2 |

Figures 3, 3A:
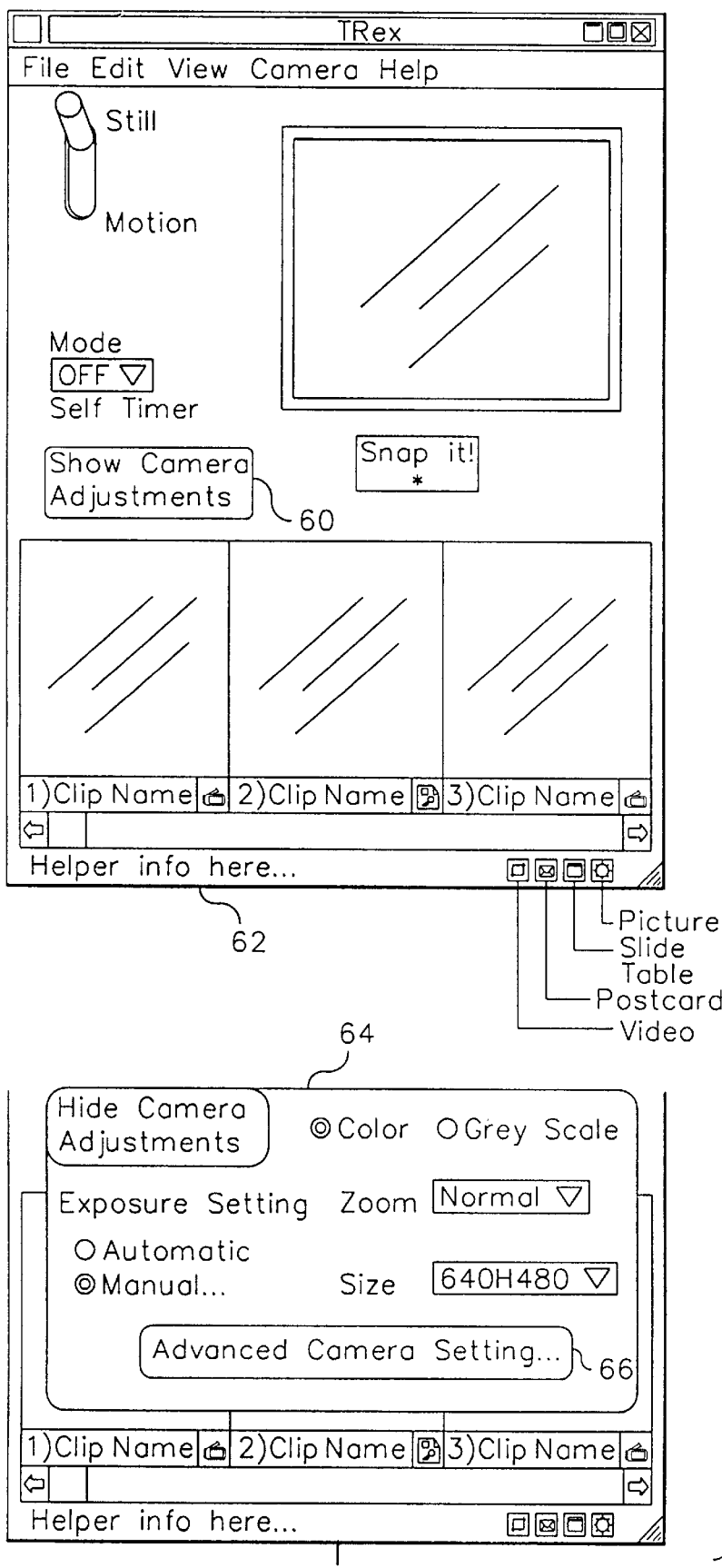
FIG. 3 shows illustrations of computer screens used as a camera user interface for the camera shown in FIG. 1.
Figure 3B:
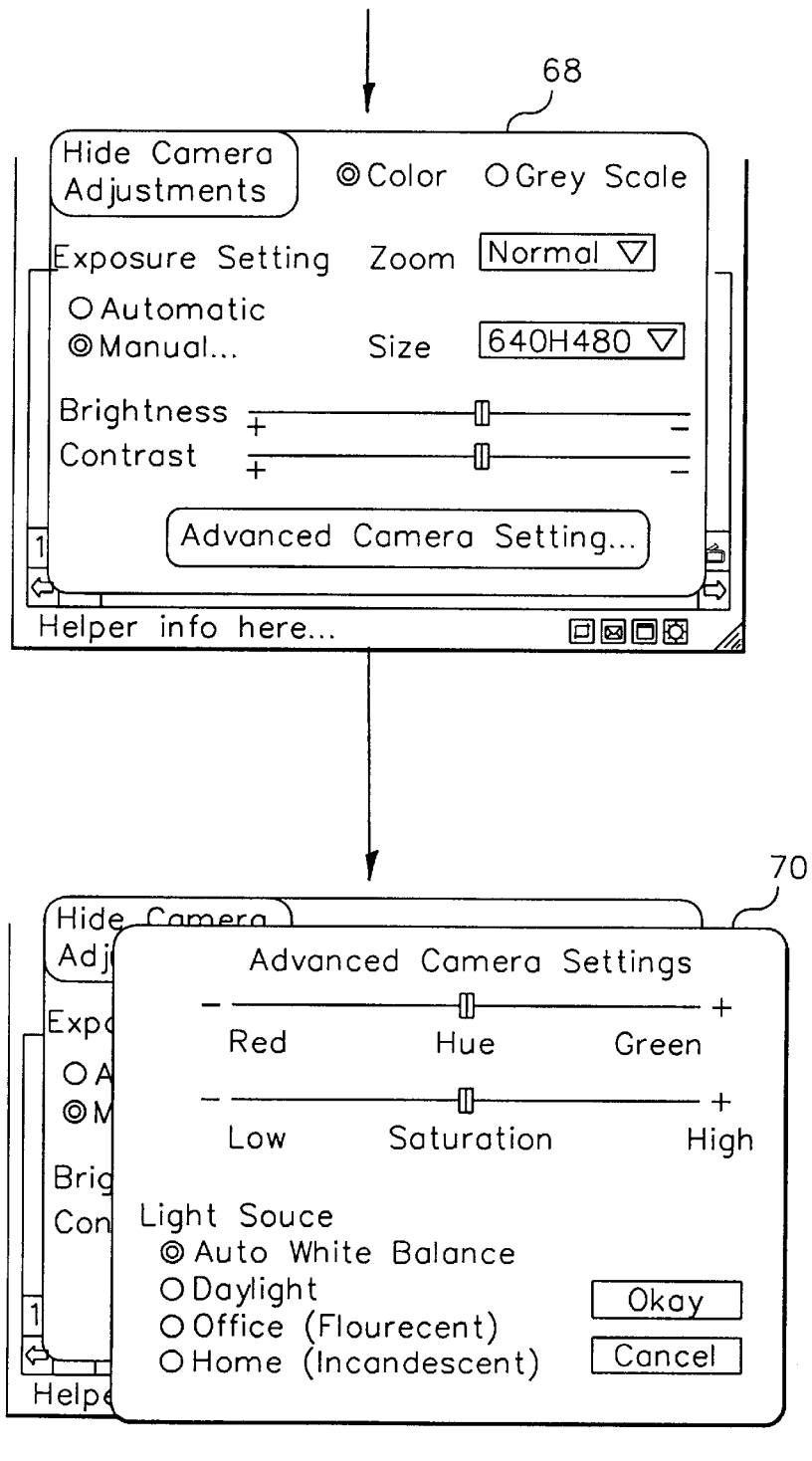

Alternately, instead of using the default parameters for configurations 0 and 1 as shown in Table 2, the user can chose preferred parameter values using the user interface screens shown in FIG. 3, which appear on the computer monitor 16 when the user interface is enabled. More specifically, the user clicks on a "camera adjustments" icon 60 on a basic screen 62 in order to pull down a camera adjustments screen 64. By then clicking on an "advanced camera settings" icon 66, an advanced camera settings screen 68 is obtained, and so on through as many additional screens 70 as are needed. The computer would take the user settings and translate them into the appropriate configuration settings for the camera, e.g., the zoom setting would be translated into the crop windows. In this manner, the camera configurations may be customized for the specific application.

For example, Table 3 shows a customized selection from the allowed values, wherein configuration 0 is a low resolution continuous (motion) monochrome configuration and configuration 1 is a low resolution continuous (motion) color configuration. When the camera is powered up, the continuous monochrome mode (configuration 0) is used first and the link field is set to configuration 0. The camera 10 thus begins sending a series of monochrome motion images, each with 320×240 green pixels, with 4 bits per pixel. This would allow a frame rate of approximately two times the frame rate of a similar resolution color image stream. The user can hold the camera while viewing the computer monitor display 16 to create a motion sequence for videoconferencing, or in order to frame a person, object, or document to be captured. When the user presses the shutter button 44, the camera immediately moves to the color motion mode and uses the parameters from configuration 1, which in this example captures a color image with 320×240 green pixels and 160×120 red and blue pixels, with 4 bits per color. Since the link field parameter is set to configuration 1, the camera begins sending a series of color images in the continuous mode. Because the parameters for the two configurations are programmed by the computer but stored in the camera mode registers 72, the desired type of motion sequence can be immediately captured when the shutter button 44 is pushed, without waiting for additional communications between the host computer 12 and the camera 10. When the user presses the shutter button a second time, the camera reverts back to configuration 0 operation and storage of the video stream is terminated.

TABLE 3

An example of camera configuration
parameters for monochrome motion to color motion
capture

| | Configuration 0 value | Configuration 1 value |
|---|---|---|
| Capture mode | Continuous | continuous |
| Button press mode | Enabled | Enabled |
| Link field | Configuration 0 | Configuration 1 |
| Color mode | Monochrome | Color |
| Number of bits per sample | 4 | 4 |
| Crop values | Starting line = 1 Ending line = 480 Starting pixel = 1, Ending pixel = 640 | Starting line = 1, Ending line = 480 Starting pixels = 1, Ending pixel = 640 |
| Green horizontal subsampling factor | 1 (320 pixels) | 1 (320 pixels) |
| Green vertical subsampling | 1/2 (240 lines) | 1 (240 lines) |
| Red and Blue horizontal subsampling factor | | 1 (160 pixels) |
| Red and Blue vertical subsampling factor | | 1 (120 lines) |
| Integration time | 30 msec | 30 msec |
| Analog gain | 7 | 7 |

Other combinations of configurations can be readily implemented. For example, configuration 0 (link field 0) could be a low resolution motion mode (by use of the subsampling factors) and configuration 1 (link field 1) could be high resolution mode. The shutter button would be used to toggle between the two odes. Another example would use configuration 0 (link field 0) as a full resolution image and configuration 1 (link field 1) as a cropped image (by appropriate use of cropped values). Then the shutter button would be used to toggle between a "conventional" image and a "zoomed" image. Many other combinations are possible, e.g., high resolution color to low resolution color, moderate subsampling to significant subsampling, low resolution color motion to high resolution monochrome still, and so on. Since the shutter button is used as a toggle to move between configurations, it takes on a multiplicity of functions. (Note that not all combinations need be exposed to the end user.)

The image data is transmitted to the host computer 12 via packets of information, which may be 64 bytes per packet when the USB "bulk" transfer mode is used. The first packet of data at the beginning of each new frame includes the configuration and status information shown in Table 4. The header begins with a 4 byte "Sync word" (1) that identifies the image frame number, followed by a value (2) that indicates how many bytes of image data are contained in the frame. The color mode and number of bits per sample (3), cropping values (4), and subsampling factors (5) provide the aforementioned configuration values. The button status (6) indicates whether or not the user is currently pressing the shutter button. (Note that this status is independent of the button press mode shown in Tables 1, 2, and 3). Following the image header, packets containing the image data are transmitted. The number of packets per frame depends on the camera configuration.

TABLE 4

Frame header configuration and status information

| | Name | Bytes |
|---|---|---|
| 1 | Sync word | 4 |
| 2 | Number of image data bytes in packet | 4 |
| 3 | Color mode and number of bits per sample | 2 |
| 4 | Cropping values | 8 |
| 5 | Green and Red/Blue horizontal and vertical subsampling factors | 2 |
| 6 | Button status | 1 |

Including the configuration information and camera status information in the data packets sent to the computer 12 has the following advantages:

The button status value (6) is used to control whether or not the image data is stored in the computer memory, typically using the computer's hard drive. For example, in some still modes it indicates that the still image should be stored, and in some continuous modes it indicates that the sequence of motion images captured when the button is depressed would be recorded as a "movie" sequence.

The sync word is used to indicate which image frame the data is from, since each image is transferred using numerous data packets. If a data packet from the "next" frame is received by the computer before all of the data from the "current" frame is received, the computer will know that one of the packets for the current frame has been "dropped". In this case, the "old" frame will be repeated, and the current frame will not be displayed. The computer will then begin building the next frame, and re-sync with the display/storage stream at the appropriate time.

The configuration information can be used by the computer to ensure that the image processing path is correctly set.

The invention has been described with reference to a preferred embodiment. However, it will be appreciated that variations and modifications can be effected by a person of ordinary skill in the art without departing from the scope of the invention.

PARTS LIST

- 10 digital camera
- 12 host computer
- 14 USB digital host interface
- 16 computer monitor
- 18 optical section
- 20 electronic image sensor
- 22 analog section
- 24 CDS/gain block
- 26 A/D converter
- 28 CCD clock drivers
- 30 digital section
- 32 CCD timing generator
- 34 static RAM memory (line store)
- 36 line store timing generator
- 38 microprocessor
- 40 USB device interface
- 42 USB cable
- 44 shutter button
- 46 LED
- 50 detachable stand
- 60 camera adjustment icon
- 62 basic screen
- 64 camera adjustments screen
- 66 advanced camera settings icon
- 68 advanced camera settings screens
- 70 additional screen
- 72 camera mode registers

What is claimed is:

1. A digital camera for capturing images and transferring the captured images to a host computer, said camera comprising:

an image sensor exposed to image light for capturing the images and generating image signals;

an A/D converter for converting the image signals into digitized image data;

a digital interface for transferring the digitized image data to the host computer;

means for controlling the image sensor in at least two different camera configurations, each configuration including configuration information defining a plurality of camera parameters;

means for storing the camera configuration information defining the plurality of camera parameters for the at least two different camera configurations;

means for selecting a camera configuration; and means for communicating at least part of the selected configuration information from the storage means along with the digitized image data to the computer via the digital interface.

2. The camera as claimed in claim 1 wherein the digital interface is a Universal Serial Bus (USB) interface.

3. The camera as claimed in claim 1 wherein said at least two different configurations comprise separate modes for still and motion readout of the sensor.

4. The camera as claimed in claim 1 wherein said at least two different configurations comprise separate modes for motion readout of the sensor.

5. The camera as claimed in claim 3 wherein, in the motion readout mode, the sensor does not transfer all of the sensor image data to the digital interface.

6. The camera as claimed in claim 1 wherein the configuration information includes at least one of a color mode, a subsampling factor, a number of bits per sample, and a cropping factor.

7. A digital camera for capturing images and transferring the captured images to a host computer, said camera comprising:

an image sensor exposed to image light for capturing the images and generating image signals;

an A/D converter for converting the image signals into digitized image data;

a digital interface for transferring the digitized image data to the host computer;

a memory for storing configuration information defining camera parameters for at least two different camera configurations, each configuration including camera parameters that apply to a current image and a linkage parameter that indicates which configuration to apply to a next image; and means for controlling the image sensor in a selected one of said at least two different camera configurations according to the configuration information that applies to the current image, wherein the controlling means is further responsive to the linkage parameter in the selected configuration to determine which configuration to apply to the next image.

8. The camera as claimed in claim 7 wherein a first value of the linkage parameter requires staying in the same configuration and a second value of the linkage parameter requires moving to another configuration.

9. The camera as claimed in claim 8 wherein the first value of the linkage parameter corresponds to capturing a sequence of continuous images in a first configuration and a second value of the linkage parameter corresponds to capturing a still image before moving to said another configuration.

10. The camera as claimed in claim 9 wherein moving to another configuration, as required by the second value of the linkage parameter, comprises moving back to the first configuration.

11. A digital camera for capturing images and transferring the captured images to a host computer, said camera comprising:

an image sensor exposed to image light for capturing the images and generating image signals;

an A/D converter for converting the image signals into digitized image data;

a digital interface for transferring the digitized image data to the host computer;

a memory for storing configuration information defining camera parameters for at least two different camera configurations, the configuration information including a linking parameter that indicates that the digital camera should shift to a second configuration after a capture is initiated in a first configuration;

a timing generator for controlling the image sensor in said at least two different camera configurations according to the configuration information defining the camera parameters, wherein the timing generator is responsive to the linkage parameter to control the image sensor in the second configuration; and means for communicating at least some of the configuration information stored in the memory from the camera to the computer via the digital interface.

* * * * *